United States Patent [19]
Davenport et al.

[11] Patent Number: 5,567,031
[45] Date of Patent: Oct. 22, 1996

[54] HIGH EFFICIENCY DUAL OUTPUT LIGHT SOURCE

[75] Inventors: John M. Davenport, Lyndhurst; Richard L. Hansler, Pepper Pike; William J. Cassarly, Richmond Heights, all of Ohio

[73] Assignee: General Electric Company, Schenectady, N.Y.

[21] Appl. No.: 139,378

[22] Filed: Oct. 20, 1993

[51] Int. Cl.⁶ ............................................. F21V 8/00
[52] U.S. Cl. ........................ 362/32; 362/298; 362/346
[58] Field of Search ............................ 362/32, 61, 296, 362/297, 298, 346

[56] References Cited

U.S. PATENT DOCUMENTS

| | | | |
|---|---|---|---|
| 1,640,448 | 8/1927 | Halvorson, Jr. | 362/346 |
| 1,837,091 | 12/1931 | Adams | 362/32 |
| 3,911,266 | 10/1975 | Oram | 362/296 |
| 4,947,293 | 8/1990 | Johnson et al. | 362/32 |
| 4,986,622 | 1/1991 | Martinez | 362/32 |
| 5,031,078 | 7/1991 | Bornhorst | 362/32 |
| 5,222,793 | 6/1993 | Davenport et al. | 362/346 |

FOREIGN PATENT DOCUMENTS

| | | | |
|---|---|---|---|
| 1036086 | 4/1953 | France | 362/296 |

Primary Examiner—Denise L. Gromada
Assistant Examiner—Y. Quach
Attorney, Agent, or Firm—George E. Hawranko; Stanley C. Corwin

[57] ABSTRACT

A centralized lighting system is provided having a high intensity light source which is disposed at approximately the first optical focal point of an ellipsoidally shaped reflector member. A mirror member, disposed in advance of a second optical focal point associated with the reflector member, receives light output from the light source and is constructed so as to divide the light output into at least first and second beam portions. The mirror member is further effective so as to separate the first and second beam portions by at least 90 degrees relative to one another. Corresponding at least first and second optical transmission members are receptive of the first and second beam portions and are effective for communicating the light output to locations remote from the light source. In one embodiment, the mirror member is V-shaped and is constructed of first and second mirror segments joined together so as to form an angle of less than about 85 degrees therebetween. The mirror member is effective for dividing the beam portions so that such beam portions are substantially equivalent to one another in terms of intensity, shape and color. The V-shaped mirror member is further effective for separating the first and second beam portions by approximately 180 degrees relative to one another.

8 Claims, 3 Drawing Sheets

HIGH EFFICIENCY DUAL OUTPUT LIGHT SOURCE

FIELD OF THE INVENTION

This invention relates to a high efficiency light source having a dual output. More particularly, this invention relates to such a light source as utilizes a single high brightness lamp whose light output is split using a reflector configuration that results in an efficient coupling of such light output into the input face of a pair of optical fibers.

BACKGROUND OF THE INVENTION

High brightness light sources have been proposed for a variety of centralized lighting applications whereby it is desired to have a single source of light which can be distributed to at least two locations remote from the light source. For instance, such a single light source, dual output arrangement could be put to beneficial use in the automotive industry for purposes of front end illumination. To this end, such a configuration has been proposed in U.S. Pat. Nos. 4,958,263 and 5,222,793 issued to Davenport et al on Sep. 18, 1990 and Jun. 29, 1993, respectively, and assigned to the same assignee as the present invention. Central source/ remote light output configurations such as this could also be put to use in other applications such as in a merchandise display situation or for medical or scientific instrumentation. In some such applications, particularly automotive forward lighting arrangements, it would be desirable to have the light source exit from the dual ports which face in opposite directions from one another. As shown in FIG. 7 of the U.S. Pat. No. 5,222,793 referenced above, one approach would be to join two ellipsoidally shaped reflectors in a back-to-back configuration with the light source disposed approximately at the center of the point at which the reflector segments are joined. Although effective in achieving a dual light output which exits the source at oppositely facing directions to one another, this approach would require precision manufacturing and assembly operations to implement and accordingly, would result in a high priced end product. Therefore, it would be advantageous if a single source, dual output lighting arrangement could be achieved at a reasonable cost in terms of manufacturing of the component elements and the assembly thereof into a system configuration.

Another approach to providing a dual output from a single light source would be by use of a reflector and mirror arrangement such as shown in FIG. 3 of previously referenced U.S. Pat. No 5,222,793. In this arrangement, two optical fibers are disposed in close contacting relation to one another so that the light output from an ellipsoidally shaped reflector is reflected off a planar mirror surface and into the input faces of the contacting optical fibers. The lengths of optical fibers can then be arranged in a manner so as to achieve an effective separation of the light output to regions 180 degrees apart from each other. Although this approach is effective in splitting the light output so as to be conveyed to opposite sides of an automobile forward lighting system for instance, the manner by which this beam splitting is achieved results in a noticeable loss of light attributable to the fact that the shape of the input surface of the two side-by-side light guides does not match the output beam pattern and light is therefore lost around the edge of the side-by-side arrangement between the light guides. Additionally, because the space in which the optical fibers are routed is typically limited, it would be desirable to have the optical fibers exit the light source at an angle of separation between 90 and 180 degrees thereby avoiding bending of the optical fibers in order to achieve the separation to the two front end locations.

Furthermore, it would be advantageous if a light coupling arrangement could be achieved whereby light would enter the light guide or intermediate optical coupling member at a reduced angle relative to the longitudinal axis (i.e. transmission axis) of the light guide or optical coupler. By minimizing the entry angle into the light guide or optical coupler, less bouncing of light rays occurs within the light guide or optical coupler. Since each bouncing action results in a measurable light loss, such loss can be minimized by reducing the entry angle and hence reducing the number of light ray bounces within the light guide or optical coupler. Thus when the entry angles of the light rays are minimized, light transmission through the light guides is maximized.

In conjunction with the reduction of the entry angle, it would be further advantageous if a larger input surface area could be provided than would otherwise be attainable in certain centralized lighting systems. For instance, for an automotive forward lighting application, a 12 mm diameter light guide is typically utilized for transmitting light output from the light source to the two headlight locations. For a lighting system using a short arc gap light source and ellipsoidal reflector as described in U.S. Pat. No. 5,222,793, substantially all of the focused light is projected across a 19 mm diameter. Hence, a 12 mm light guide is ineffective for picking up light that occurs out to a 19 mm diameter round surface area. Therefore, it would be desirable to allow for collecting as much light as possible with a larger input surface area, yet still avoiding collection of such light over large entry angles.

SUMMARY OF THE INVENTION

The present invention provides a centralized lighting system that achieves a maximum input coupling efficiency between the light source and the light collection arrangement. This centralized lighting system further provides for the distribution of such light output at ports which are spread apart from one another by at least 90 degrees and wherein the light input to the light collection arrangement occurs at a maximum input surface area yet at a reduced angle of entry.

In accordance with the principles of the present invention, there is provided a centralized lighting system that includes a high intensity light source effective for generating light output in a predetermined beam pattern. The light source is disposed approximately at the first optical focal point associated with a curved reflector member. A mirror member is disposed between the light source and a second optical focal point associated with the reflector member and is constructed so as to divide the light output from the light source into at least a first and a second beam portion each having essentially the same shape as one another. The mirror member is further effective for separating the at least first and second beam portions from one another by at least 90 degrees. At least first and second optical transmission members are receptive of respective ones of the first and second beam portions and are effective for transmitting light output to locations remote from the light source.

In one embodiment of the invention, the mirror member is comprised of first and second mirror segments which are joined together in a V-shaped configuration having an angle of less than about 85 degrees formed therebetween. The angle of separation between the mirror segments can be reduced in order to minimize the entry angle of light rays into the optical transmission members whether such transmission members are light guides or optical coupling devices.

BRIEF DESCRIPTION OF THE DRAWINGS

In the following detailed description, reference will be made to the attached drawings in which.

DETAILED DESCRIPTION AND OPERATION

Figure 1:
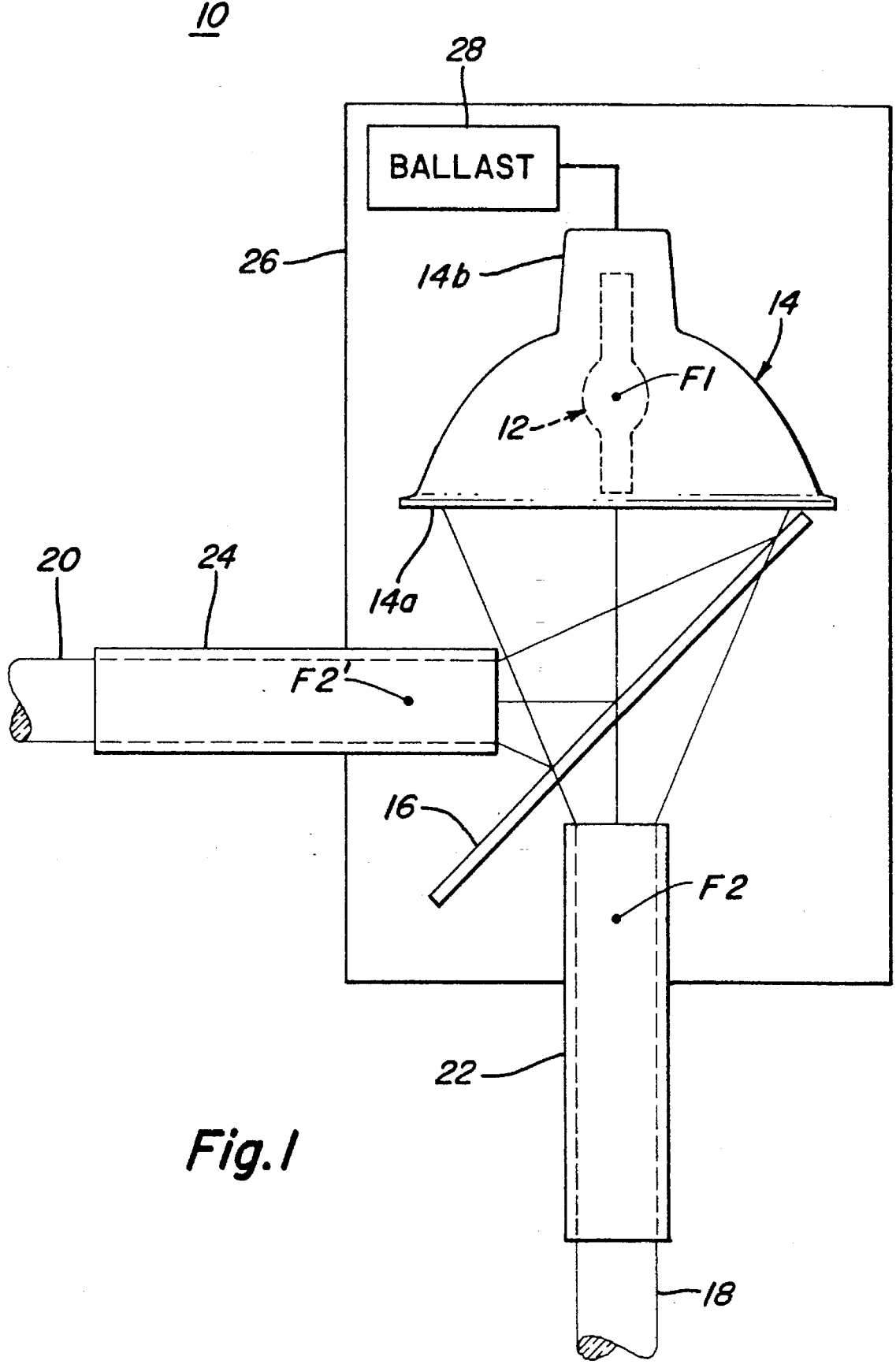
FIG. 1 is an elevational view in section of a centralized lighting system constructed in accordance with one embodiment of the present invention.

As seen in FIG. 1, the centralized lighting system 10 of the present invention includes a high intensity light source 12 disposed within a reflector member 14. The reflector member can be ellipsoidally shaped, or shaped in another arcuate manner so as to achieve a first optical focal point F1 at which the light source 12 can be disposed. The light source 12 can be provided by way of a high intensity discharge lamp such as described in U.S. Pat. No. 5,239,230 issued to Mathews et al on Aug. 24, 1993, assigned to the same assignee as the present invention and herein incorporated by reference. In this patent, a light source is described having a short arc gap, on the order of 4 mm or less, and a brightness level of approximately 50,000 lumens per centimeter of arc gap unit area. It should be understood that alternate types of light sources could be utilized in conjunction with the central lighting system disclosed herein, for instance, an incandescent lamp using a tungsten halogen light source could be utilized as well as other discharge lamps having longer arc gaps or lesser brightness levels.

Ellipsoidally shaped reflector member 14 has an open end 14a and a neck portion 14b in which one end of the light source 12 is mounted. The light source 12 is mounted along the longitudinal axis of reflector member 14 at the first optical focal point associated with the reflector member 14. By such positioning of the light source 12 at the first optical focal point F1 of reflector member 14, it is known that a concentrated light output is generated by the short arc gap, high brightness light source 12 which will be imaged at the second optical focal point F2 associated with reflector member 14.

In order to achieve a dual light output arrangement as would be necessary for an automotive forward lighting application for instance, it is necessary to divide the imaged light output which occurs at the second optical focal point. In the centralized lighting system 10 of FIG. 1, the light output dividing operation is accomplished by means of a beam splitting mirror 16 disposed between the open end 14a of reflector member 14, and the second optical focal point of such reflector. The beam splitting mirror member 16 is a multi-layered, non-absorbing mirror designed for an angle of incidence of 45 degrees and is commercially available from optical supply companies. An example of such a mirror is available from Melles Griot Inc. as their product number 03 BTF 007.

The short arc gap light source 12, mounted axially within ellipsoidally shaped reflector member 14, is imaged at the second optical focal point as a round spot with the highest light intensity occurring at the center of the round spot and diminishing radially outward therefrom. It is a desirable feature, and in the instance of automotive forward lighting, a necessary feature, that the beam patterns delivered from the respectively light guides, are substantially the same in terms of beam shape, intensity and color. With the beam splitting mirror member 16, it is possible to place the input ends of a pair of round light guides 18, 20 precisely concentric with first and second round beam portions divided from the point source light output of light source 12. The beam splitting mirror member 16, placed in advance of the second optical focal point of reflector member 14, is effective for dividing the single light output into a reflected beam and a transmitted beam. Each of the reflected beam and the transmitted beam is substantially similar to one another in shape, intensity and color. Each one of the reflected beam and the transmitted beam is introduced to a respective input end of either one of the light guides 18, 20.

By use of a beam splitting mirror member 16 having an incidence angle of 45 degrees, the first and second round light guides 18, 20 can then be disposed at a 90 degree separation from one another. If the centralized lighting system 10 of FIG. 1 were then utilized in an automotive forward lighting application, it would be necessary to bend one or both of the light guides 18 or 20 so as to achieve a 180 degree split between the two light outputs of the lighting system 10 to reach the two headlight positions on the vehicle.

The centralized lighting system 10 of FIG. 1 further includes a housing 26 which encloses the light source 12, reflector member 14, beam splitting mirror member 16, as well as the necessary ballast circuit 28 for energizing light source 12. Ballast circuit 28 can be provided by conventional circuitry and can be powered from an external source (not shown) either of a DC or AC type. Cladding sleeves 22, 24 can be disposed around the portion of each light guide 18, 20 that exits the housing 26. A centralized lighting system 10 as shown in FIG. 1 was constructed and operated with the result that an improved coupling efficiency was achieved whereby 1050 lumens were introduced by the reflected beam to a light guide having 12 mm diameter and 1064 lumens were introduced by the transmitted beam to a 12 mm diameter light guide. By comparison the concentrated light output was directed to a single light guide having a 12 mm diameter, there were 2059 lumens introduced to the input end of such light guide. Accordingly, it can be seen that the beam splitting arrangement of the present invention achieves a high degree of coupling efficiency in splitting the beam, and further, achieves a split that results in beam portions that are substantially similar in terms of intensity as well as shade and color. Moreover, it can be appreciated that since the transmitted and reflected beam portions resulting from the beam splitting operation were shaped the same as one another and were in fact, the same round shape as the beam pattern output from the light source 12, a maximum coupling efficiency can be achieved by selection of light guides which have round cross-sectional shapes and which are sized to be substantially the same as the size of the reflected and transmitted beam portions corresponding to the high intensity round center portion and the outer periphery thereof where the intensity has not diminished significantly. Such a coupling efficiency could not be achieved for a dual port configuration which utilized a mirror transfer technique to direct the round light output to an area occupied by two separate round light guides joined in a side-by-side contacting relation. In such a side-by-side arrangement, there would be a significant amount of light lost around the edges of the joined light guides that did not fill in to achieve a larger round cross-sectional area.

Figure 2:
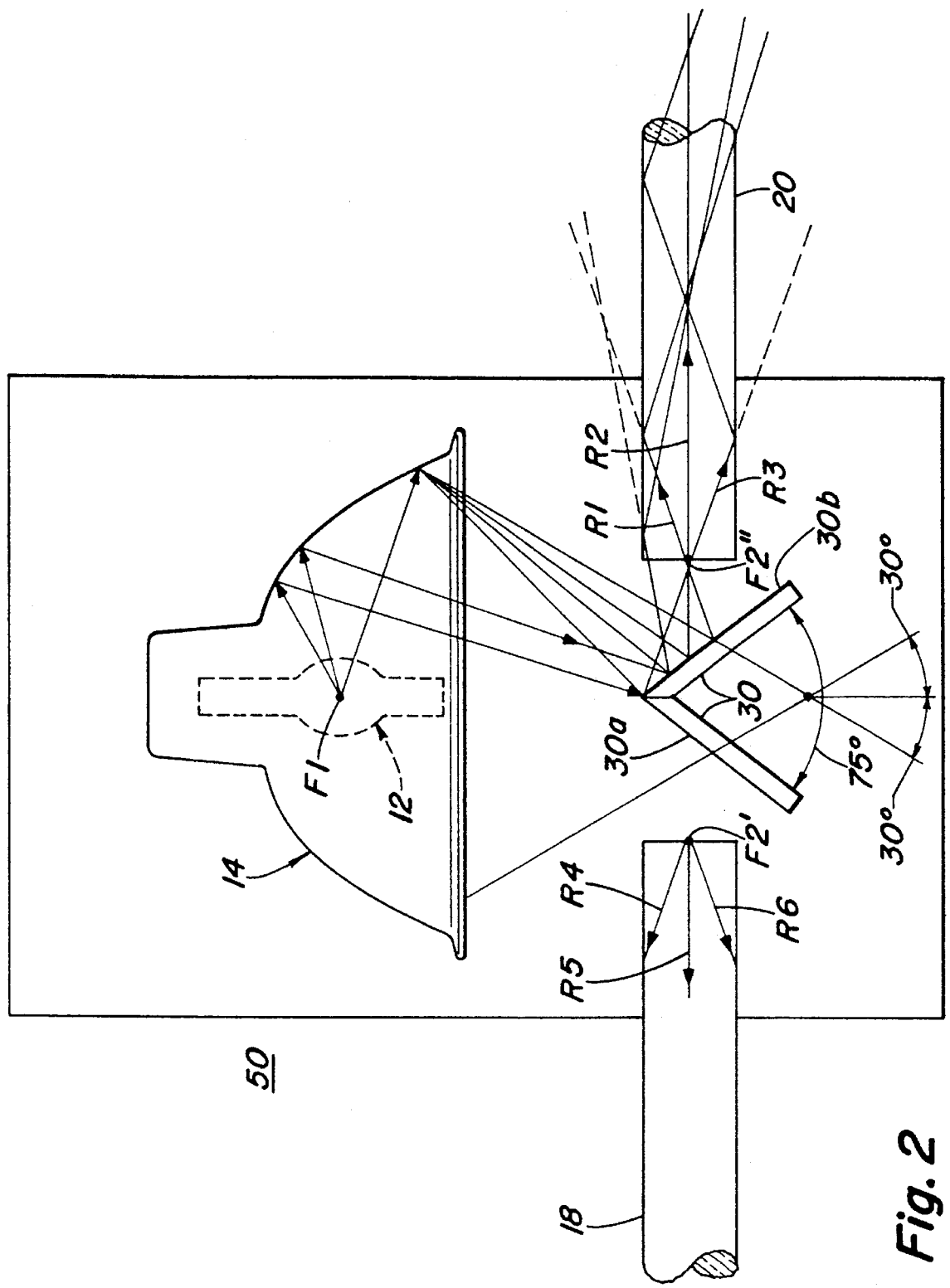
FIG. 2 is an elevational view in section of another centralized lighting system constructed in accordance with another embodiment of the present invention.

As seen in FIG. 2, an alternate centralized lighting system 50 is proposed using some like components as described relative to FIG. 1; such like components having the same reference numbers as in FIG. 1. Unlike the centralized lighting system 10 of FIG. 1 however, the system 50 of FIG. 2 provides a dual output configuration in a manner whereby the first and second light guides 18, 20, exit the housing 26 separated by 180 degrees from one another. In this manner, it is no longer necessary to bend one or both of the light guides 18 or 20 so as to extend to the two headlight locations needed for an automotive forward lighting application.

As further distinguished from the centralized lighting system 10 of FIG. 1, the lighting system 50 of FIG. 2 utilizes a mirror configuration 30 that includes first and second mirror segments 30a and 30b joined together in a V-shaped arrangement. Similar to the placement of beam splitting mirror 16, the v-shaped mirror 30 of FIG. 2 is disposed between the first and second optical focal points of reflector member 14.

In the configuration of FIG. 2, in which reflector member 14 outputs light having a spread of ±30 degrees, first and second mirror segments 30a and 30b have approximately a 75 degree angle therebetween. The separation angle between mirror segments 30a and 30b is set to minimize the average angle of light inputted to light guides 18, 20 thereby maximizing light through the light guides. Of course, it should be understood that the separation angle between mirror segments 30a, 30b is largely determined by the angle between the outer rays (i.e. beam spread) reflected by reflector member 14. Generally, for a beam spread wider than the ±30 degrees of reflector 14, the separation angle would be less than 75 degrees. For instance, the separation angle should be approximately 70 degrees if the beam spread is ±40 degrees. Conversely, if the beam spread is smaller, the separation angle would be greater than 75 degrees as required. Rather than adjusting the angle between mirror segments to achieve the minimum average entry angle to the light guides, it would also be possible to change the angle of the light guides 18, 20.

By the specified placement ahead of the second optical focal point and the orientation of mirror segments 30a and 30b relative to one another, the point source light output from light source 12 can be split and separated into portions which are 180 degrees apart from one another and which are shaped like a substantial portion of the beam pattern from light source 12. In other words, the V-shaped mirror member 30 of FIG. 2 accomplishes the same result in terms of splitting a single point source of light output into portions having the same shape, intensity and color, as was achieved by the beam splitting mirror 16 of FIG. 1. However, whereas beam splitting mirror 16 separated the beam portions by 90 degrees, the V-shaped mirror member 30 separates the beam portions by 180 degrees which allows for the distribution of light output to locations which are 180 degrees apart from one another without requiring the transmitting light guides to be bent.

In assembling the overall centralized lighting system 50 as shown in FIG. 2, it should be understood that such system will also include the ballast circuit arrangement 28 as described with respect to FIG. 1 and may also include the cladding sleeves 22, 24 around portions of the light guides 18, 20 as they exit the housing 26. Additionally, the assembly operation will include the steps of disposing the input ends of the light guides 18, 20 in such a manner as to be aligned with the top portion of the V-shaped mirror member 30. By such an alignment between the V-shaped mirror member 30 and the light guides 18, 20, the centralized lighting system 50 maximizes the amount of light which enters the light guides 18, 20 above a horizontal plane which bisects the light guides 18, 20. It is the orientation of the mirror members 30a and 30b at an angle of less than about 85 degrees, and preferably 75 degrees that allows maximizing the light transmission through the light guides. It has been measured that if the mirror segments 30a and 30b were to be disposed at a 90 degree angle relative to one another, the majority of light input to the light guides would be directed at angles above an imaginary horizontal plane which passes through F2' and F2" and which is perpendicular to the F1–F2 reflector axis, thereby resulting in an uneven beam pattern output at the delivery ends of the light guides 18, 20. As previously discussed, however, the average entry angle could be alternatively minimized by reducing the angle between reducing the angle between the light guides 18, 20. Additionally, light rays which enter the light guides at the higher angles associated with a V-shaped mirror greater than about 85 degrees, are subject to a greater number of bouncing actions within the light guides until reaching the output end; it is known that the more bouncing that occurs within the light guide, the greater the light loss that occurs. Therefore, by use of an orientation between the mirror segments of less than 85 degrees and preferably 75 degrees, light now enters the light guides 18, 20 symmetrically about the imaginary horizontal plane which passes through F2' and F2" and which bisects such light guides. In this manner, the input light is spread over a smaller angle relative to the F2"–F7" axis in the vertical direction and there is no change in the horizontal direction. This means that a larger fraction of the light is substantially parallel to the axis of the light guides 18, 20 so that the input light experiences a shorter path with fewer bounces. Therefore, the centralized lighting system 50 shown in FIG. 2 achieves a uniform beam shape at the output end of the light guides 18, 20 and experiences less light loss through the light guides 18, 20 by reducing the number of bounces as would be experienced with a greater angle between the mirror segments 30a and 30b. As a further advantage to the use of mirror segments that are joined at an angle of less than about 85 degrees is that such V-shaped mirror arrangement can be moved closer to the light source/reflector configuration. As the angle between the mirror segments 30a and 30b is reduced, the reflected second focus points F2' and F2" are relocated such that the optical couplers may be placed closer to the mirror segments and the overall size of the system is reduced.

Although FIG. 2 is illustrated as having an angle of 75 degrees separating mirror segments 30a and 30b, it should be understood that other angles less than about 85 degrees could be utilized as well. The value of 75 degrees is most appropriate in centralized lighting system 50 because of the fact that light is output from the ellipsoidally shaped reflector member 16 spread over approximately ±30 degrees. As mentioned above, if mirror segments 30a and 30b were to be joined at an angle of 90 degrees, the majority of light input to the light guides would be directed at an angle above the imaginary horizontal plane which passes through F2' and F2". More specifically, the center ray having the greatest light intensity would be directed at an upward angle of 15 degrees relative to the transmission axis F2'–F2". In order to maximize the coupling efficiency between the light output from the ellipsoidal reflector member 16 to the V-shaped mirror member it is necessary to maximize light intensity by reflecting each beam portion such that the central rays, such as R2 and R5, are substantially parallel to the light transmission axis, F2'-F2". As a result, the outer rays, R1, R3, R4, and R6 will enter the light guides at maximum angles of approximately ±15 degrees relative to the transmission axis F2'-F2". Thus in order to minimize the entry angles of light rays into the light guides, the two mirror segments must be moved closer together by about 7.5 degrees each away from a 90 degree original orientation relative to one another. This same relationship between the reflector beam spread and the angle of mirror members would hold true for an alternate reflector having a beam spread different than 30 degrees and it is intended that such other reflector and V-shaped mirror having a spread of less than about 85 degrees would be within the scope of the present invention.

Figure 3:
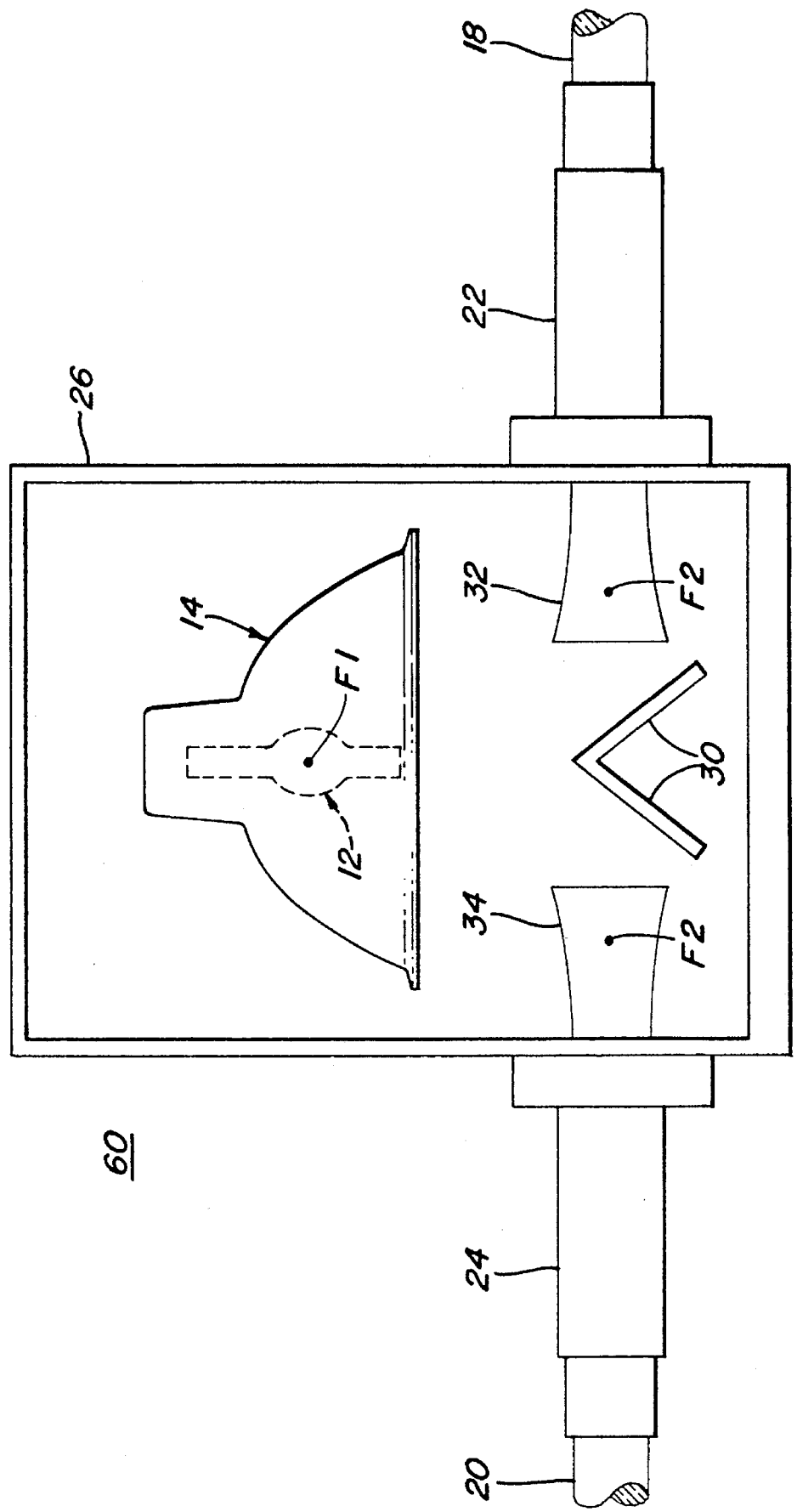
FIG. 3 is an elevational view in section of the centralized lighting system of FIG. 2 further modified to include an optical coupling member.

As seen in FIG. 3, another alternate centralized lighting system 60 includes a number of like components previously discussed with respect to FIGS. 1 and 2 and therefore will utilize the same reference numbers. The centralized lighting system 60 of FIG. 3 is the preferred embodiment and further includes a modification to the system 50 of FIG. 2 that allows for the use of light guides having smaller dimensions than those previously discussed or allows for collecting a greater amount of light output off of the V-shaped mirror arrangement 30. The ability to vary the size of the light guide or the amount of light pickup from the V-shaped mirror 30 is achieved by use of funnel shaped optical coupler members 32, 34 disposed partially within housing 26 and extending partially outside of the housing 26 so as to be joined to the light guides 18, 20 by means of sleeve members 22, 24. Funnel shaped coupler members 32, 34 can be constructed of a fused quartz material. As discussed with respect to the centralized lighting system 10 of FIG. 1, 12 mm light guides were utilized for measuring the input light levels of the transmitted and reflected beam portions. Such a 12 mm diameter light guide is suitable for use in most centralized lighting systems and allows sufficient system flexibility for delivering the light output to various spread apart light delivery locations. In a system where the more flexible 12 mm diameter light guide is not required however, it would be possible to use a larger diameter light guide and pick up more light output off of the V-shaped mirror arrangement 30. For example, as previously discussed, the point source light output from light source 12 is round in shape having the highest intensity at the center of such round shape and diminishing in intensity as one moves radially outward from the center of the round spot. In fact, with the light source, reflector configuration wherein the arc gap of the light source is less than about 4 mm, and the reflector member is sized accordingly, it is known that there is additional light available out to about 19 mm in diameter.

The funnel shaped coupler members 32, 34 can be tapered down from a larger diameter which allows for the pickup of the additional light out towards the 19 mm dimension, to the 12 mm size of the light guides 18, 20. The angle of taper for funnel couplers 32, 34 should not exceed a few degrees, since the reflected light will experience a change in direction which is double the angle of the taper. Additionally, the length of funnel couplers 32, 34 should be such that very few rays experience more than reflection from the funnel portion. An example of a design which meets these requirements would have the overall length of funnel couplers 32, 34 at 25 mm and a diameter which tapers from 15 mm to 12 mm thus corresponding to an angle of taper of 3.4 degrees. In practice, it has been determined that this design results in a few light rays close to the edge of the funnel couplers 32, 34 where the intensity is lowest and the light rays are at the largest angles (near 30 degrees), will hit the funnel coupler 32 or 34 twice within the funnel portion. The majority of the light rays near the edge are small angle rays which enter the straight portion of the funnel couplers 32, 34 at angle well below this 30 degree limit and will therefore not experience the multiple bounces within the funnel couplers 32, 34. Actual measurements of coupling efficiency were made utilizing the funnel couplers 32, 34 and it was found that there was a 5.3% improvement in light output from the 12 mm light guides compared to a system using a straight 12 mm light guide. Moreover, the centralized lighting system 60 utilizing the funnel couplers 32, 34 have the added advantage that the output is less sensitive to minor changes in position or alignment. It should be understood that the funnel shaped coupler members 32, 34 can be implemented in the centralized lighting system 10 of FIG. 1 to achieve equally improved coupling efficiencies.

Although the hereinabove described embodiments of the invention constitute preferred embodiments of the invention, it should be understood that modifications can be made thereto without departing from the scope of the invention as set forth in the appended claims. For example, rather than a dual output arrangement, it would be possible to modify mirror member 30 of FIGS. 2 and 3 so as to provide for a four port arrangement. By utilizing four mirror segments arranged in a pyramid configuration and positioned and angled the same as mirror 30, the light output could be split into four portions separated by 90 degrees from one another. Other multiple mirror arrangements could be equally effective. Additionally, it would be possible to use the light source 12, reflector configuration together with the V-shaped mirror 30 such that the light output off of mirror 30 could act as a split floodlight arrangement if the light guides 18, 20 or optical couplers 32, 34 were eliminated.

We claim:

1. A centralized lighting system comprising:

a source of high intensity light generating a light output;

a reflector member shaped in a curved manner and having first and second optical focal points, said reflector having a reflector axis which passes through said first and second optical focal points, said light source being disposed at the first optical focal point, said reflector being configured to reflect said light output in a predetermined angular beam spread relative to said reflector axis;

a v-shaped mirror member disposed between said first and second optical focal points, said v-shaped mirror member comprising first and second mirror segments, each of said mirror segments positioned at a predetermined angle relative to said reflector axis to direct said light output and wherein each mirror segment defines a reflected second focus point, said mirror member configured for receiving said light output and configured for dividing said light output into first and second beam portions which are reflected from said mirror segments, respectively, up to 90 degrees relative to said reflector axis;

first and second optical transmission members each having an optical transmission axis, each optical transmission member configured for receiving one of said beam portions and transmitting the beam portion along its transmission axis to a location remote from said light source;

wherein an input surface area of each optical transmission member is disposed substantially at one of said reflected second focus points to maximize the light input into the optical transmission member; and wherein the predetermined angle of each mirror segment is set such that an angle of one of said first and second beam portions entering the optical transmission member is minimized relative to the transmission axis so as to maximize light transmission along each transmission axis to said location remote from said light source.

2. A centralized lighting system as set forth in claim 1 wherein said first and second mirror segments form an angle of less than about 85 degrees therebetween, and said mirror member divides said light output into said first and second beam portions each having essentially the same shape as one another.

3. A centralized lighting system as set forth in claim 2 wherein said reflector member is effective for outputting said light output over a range of ±30 degrees relative to said reflector axis and said first and second mirror segments form an angle of approximately 75 degrees therebetween.

4. A centralized lighting system as set forth in claim 2 wherein said first and second optical transmission members are separated from one another by approximately 180 degrees.

5. A centralized lighting system set forth in claim 1 wherein said curved reflector member is ellipsoidally shaped.

6. A centralized lighting system set forth in claim 1 wherein said light source is a high intensity discharge lamp capable of producing a concentrated light output.

7. A centralized lighting system comprising:

a high intensity light source generating light output;

an ellipsoidally shaped reflector member having first and second optical focal points, said light source being disposed at said first optical focal point;

a v-shaped mirror member disposed between the first and second optical focal points, said mirror member configured for receiving said light output and having first and second mirror segments positioned to form an angle of less than about 85 degrees therebetween, said mirror member configured for dividing said light output into first and second beam portions which are reflected from said mirror segments, respectively, in oppositely facing directions to one another, each mirror segment having a reflected second optical focal point associated therewith and said mirror member configured for reflecting said beam portions to the respective reflected second optical focal points of said respective mirror segments;

first and second optical transmission members each having an optical transmission axis, each optical transmission member configured for receiving one of said beam portions and transmitting said light output along its transmission axis to a location remote from said light source; and, wherein an input surface area of each optical transmission member is disposed at one of said reflected second optical focal points so as to maximize the light input into said optical transmission member; and, wherein said mirror member reflects each beam portion to minimize an angle of one of said first and second beam positions entering each of the optical transmission members relative to the transmission axis of said optical transmission member as to maximize the light transmission through each optical transmission member to said location remote from said light source.

8. A centralized lighting system as set forth in claim 7 wherein said high intensity light source is a high intensity arc discharge light source having an arc gap associated therewith which is less than about 4 mm in length and which is capable of generating approximately 50,000 lumens per centimeter of arc gap unit area.

* * * * *